UNITED STATES PATENT OFFICE.

CHARLES W. BERRY, OF ST. LOUIS, MISSOURI, ASSIGNOR TO LACLEDE-CHRISTY CLAY PRODUCTS COMPANY, OF ST. LOUIS, MISSOURI, A CORPORATION OF MISSOURI.

REFRACTORY BRICK.

1,373,854.     Specification of Letters Patent.     Patented Apr. 5, 1921.

No Drawing.     Application filed April 4, 1918. Serial No. 226,745.

*To all whom it may concern:*

Be it known that I, CHARLES W. BERRY, a citizen of the United States, residing at St. Louis, in the State of Missouri, have invented certain new and useful Improvements in Refractory Bricks, of which the following is a specification.

This invention relates to improvements in refractory bricks and the like, and to an improved process of manufacturing the same. The principal object of the invention is to provide a new refractory brick composed of a composition of matter comprising the ingredients herein described. A further object is to provide an improved method of combining and treating the ingredients to form the resulting product.

My improved refractory brick is formed from a mixture comprising or consisting of raw bauxite, essentially $Al_2O_3.2H_2O$ and raw magnesite $MgCO_3$. Bauxite and magnesite, both when raw and calcined, contain certain impurities, such as silica $SiO_2$, iron oxid $Fe_2O_3$, titanium oxid $TiO_2$, and traces of other materials which, however, do not interfere with the formation of my improved brick. When the composition is formed from raw bauxite and magnesite, I preferably use about two parts by weight of bauxite to one part by weight of magnesite, the mixture depending upon the chemical analyses of the raw materials.

In forming the composition, the raw bauxite and raw magnesite are ground together to a powder, the grinding operation being carried on in a dry pan or other suitable device. The ground mixture is then mixed with a suitable amount of water in a wet pan or pug mill and worked until a plastic mass is produced. This plastic mixture is then formed into bricks, blocks or other shapes convenient for handling and dried, after which the dried bricks are burned or calcined at a temperature sufficient to drive off the moisture content and gases and to effect the volume shrinkage. In some instances the ground mixture may be formed into bricks without the addition of water. During the calcining operation, the bauxite and the magnesite are converted into aluminum oxid and magnesium oxid, respectively, the addition of heat causing the bauxite, $Al_2O_3.2H_2O$ to break up into aluminum oxid $Al_2O_3$, plus water, $2H_2O$, and causing the magnesite, $MgCO_3$ to break up into magnesium oxid, $MgO$, and carbonic acid gas $CO_2$. After calcining the bricks, they are reground to a powder, and this powder is worked in a wet pan or pug mill with water and formed into the shapes desired. If desirable, a suitable binder may be added to the wet mass, it having been found that one per cent. of lime, for example, may be used with satisfactory results, although other binders such as sodium silicate, calcium chlorid, aluminum sulfate, or plastic clay, may be used. Where sufficient pressure is obtainable, a binder is not needed. After having formed the bricks from the wet mass, they are burned at a temperature sufficient to produce hard refractory brick.

In some instances, I have found it desirable to avoid the expense and trouble of forming the ground bauxite and magnesite into bricks and blocks for calcining, and in that event the mixture may be calcined in a powder form by means of a rotary furnace or the like. In carrying out the process either raw or burned bauxite or magnesite may be used, although when burned magnesite and burned bauxite are used the preliminary grinding and calcining are not necessary since the materials may be pulverized and made into brick directly.

It will be obvious that my invention is susceptible of modifications and improvements, and I do not wish to be restricted to the specific proportions or ingredients mentioned except as defined in the appended claims.

What I claim is:

1. A process of manufacturing refractory material consisting in first mixing the desired proportions of magnesite and bauxite in a raw condition, then mixing water with the same, then burning the resultant product at a temperature sufficient to drive off moisture and gas, next regrinding said calcined product and mixing with water, finally forming same into a suitable shape, and burning such shape to produce a hard refractory article.

2. A process of manufacturing refractory material consisting in making a mixture of magnesite and bauxite, then grinding such mixture and mixing a liquid with the same, then calcining such mixture at a temperature sufficient to drive off the water and gas, then regrinding such calcined product, then shaping the same into a desired form, and finally burning the article produced.

In testimony whereof I have subscribed my name.

CHARLES W. BERRY.

Witnesses:
H. LETROS,
R. A. BURNS.